H. ATWOOL.
VEHICLE HUB.
APPLICATION FILED MAR. 24, 1915.
1,177,086.
Patented Mar. 28, 1916.
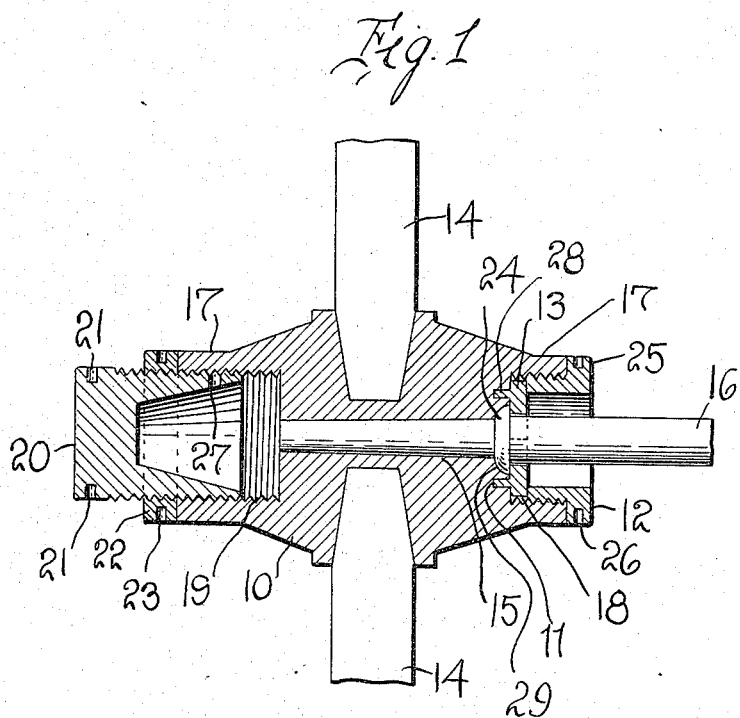
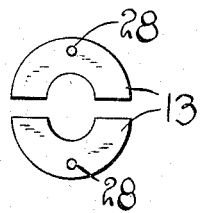
Inventor
H. ATWOOL
By Watson E. Coleman
Attorney

UNITED STATES PATENT OFFICE.

HARRY ATWOOL, OF OGDEN, UTAH, ASSIGNOR OF ONE-HALF TO HENRY BATEMAN, OF OGDEN, UTAH.

VEHICLE-HUB.

1,177,086.      Specification of Letters Patent.      Patented Mar. 28, 1916.

Application filed March 24, 1915. Serial No. 16,771.

*To all whom it may concern:*

Be it known that I, HARRY ATWOOL, a citizen of the United States, residing at Ogden, in the county of Weber and State of Utah, have invented certain new and useful Improvements in Vehicle-Hubs, of which the following is a specification, reference being had to the accompanying drawings.

My present invention relates to new and useful improvements in hubs for vehicle wheels and as its principal object aims to provide a device of this character which is relatively simple in construction and is equipped with means whereby a quantity of lubricant may be contained within the hub and continuously forced under pressure on to the bearing surface of the axle.

Another and important object is to so design the hub that the interior thereof will be thoroughly protected against the entrance of dirt, dust and the like.

The above, and other incidental objects of a similar nature, which will be hereinafter more specifically treated are accomplished by such means as are illustrated in the accompanying drawings, described in the following specification, and then more particularly pointed out in the claims which are appended hereto and form part of this application.

With reference to the drawings, wherein there has been illustrated the preferred embodiment of this invention, as it is reduced to practice, and throughout the several views of which similar reference numerals designate corresponding parts, Figure 1 is a longitudinal section taken medially through the hub, Fig. 2 is a detail face view of the split collar employed as a wearing surface for the axle shoulder.

As best disclosed in Fig. 1 of the accompanying drawings, the hub includes a substantially cylindrical body portion 10, a lubricant feeding cap 20, an axle retaining nut 12 and a split collar 13. The body member 10 is adapted to receive the spokes 14 in the well known manner and is provided with a longitudinal bore 15 in which the terminal portion of the axle 16 is adapted to rotate. The body portion is cored out at each terminal to produce the sleeves 17 which define the annular chambers 18 and 19. The chamber 19 at the outer end of the hub is adapted to receive a quantity of lubricant which is forced under pressure into the bore 15, by the cap 20. This member 20 is externally screw-threaded so that it may engage with the internal threads of the sleeves 17. The outer terminal of the cap is provided at its face with a plurality of circumferentially spaced sockets 21 in which may be engaged the lugs of a spanner or carriage wrench, when the cap is to be threaded outwardly for the insertion of more lubricant in the chamber 19 or is to be threaded inwardly in exerting pressure on the lubricant contained therein. A locking nut indicated at 22 is threaded on the cap for holding this member in adjusted position. Sockets 23 are formed in the nut 22 for the purpose above explained in connection with the sockets 22. The split collar 13 is, as shown, inserted in the chamber 18 and is disposed at the inner end thereof, so that it may serve as a wearing surface which receives the thrust of the stop shoulder 24 of the axle, which seats in a socket 29 formed in the end of the axle. This stop shoulder 24 is, of course, formed integrally with the axle and by engagement with the split collar 13 and the end of the hub, serves to limit the inward movement of the axle into the hub. The retaining nut 12 is threaded into the sleeve 17 and bears against the collar 13 for holding the axle against withdrawal from the hub. The outer end of the nut is provided with a laterally extending flange 25 which bears against the adjacent terminal of the adjacent sleeve 17 and is provided with the circumferentially spaced sockets 26. These sockets are designed to receive a spanner or wrench when the nut is to be tightened thereon.

From the foregoing description and upon particular reference to Fig. 1 of the accompanying drawings, it will now be seen that the lubricant contained within the chamber 19 may be constantly forced into the bore 15 under pressure, by threading the cap 20 inwardly at intervals. An aperture 27 is preferably provided in the cap adjacent the inner end thereof, so that the cap need not be completely removed from the sleeve, when it is desired to place a new supply of lubricant in the chamber 19. Lateral lugs 28 carried by the split collar 13 are seated in diametrically opposed sockets 11 formed in the hub at the inner end of the chamber 18. These lugs obviously serve to hold the collar against rotation.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that various minor changes in details of construction, proportion and arrangement of parts may be resorted to, when required, without sacrificing any of the advantages of this invention, as defined in the appended claims.

What is claimed is:—

1. A hub including a body member having a longitudinal axle receiving bore, a sleeve extending from the terminal thereof, an annular recess formed in the hub, said recess being adapted to receive an annular shoulder formed on the axle received within the hub, a collar disposed in the sleeve, said collar being formed in two semi-circular sections, each provided with a pin which is engageable in the end of the hub for holding the sections against rotation, and an axle retaining nut threaded into the sleeve and in engagement against the collar for maintaining the same in engagement against the end of the hub, whereby the shoulder of the axle, which is received in the hub, is maintained within said recess.

2. A hub including a body member having a longitudinal axle receiving bore, the hub being formed to provide a lubricant receiving chamber at its outer end, an externally threaded cap engaging with the wall of said chamber and longitudinally adjustable therein whereby lubricant contained within the chamber may be forced under pressure into the axle receiving bore, said cap being hollow and the wall of the cap being formed with an opening leading into the hollow interior of the cap, said opening being normally closed when the cap is in position, but when the cap is rotated outward to a predetermined distance with relation to the chamber said opening being disclosed whereby lubricant may be inserted within the chamber without entirely removing the cap.

3. The combination with an axle having a shoulder, of a hub having at its outer end an interiorly screw threaded lubricant containing chamber, at its other end an internally threaded chamber and having an axle receiving bore extending through the hub from chamber to chamber, said bore adjacent the last-named chamber being enlarged to receive the shoulder on the axle, an externally threaded cap longitudinally adjustable in the first-named chamber whereby lubricant may be forced under pressure into the axle receiving bore and around the axle, a collar disposed around the axle and bearing against said shoulder and disposed in the second-named recess, and an annular retaining nut engaging said recess and bearing against said collar to retain it against the shoulder and the axle to thereby prevent the passage of lubricant beyond the shoulder on the axle.

In testimony whereof I hereunto affix my signature in the presence of two witnesses.

HARRY ATWOOL.

Witnesses:
HENRY BATEMAN,
HAZEL HEWITT.